Figure 8:
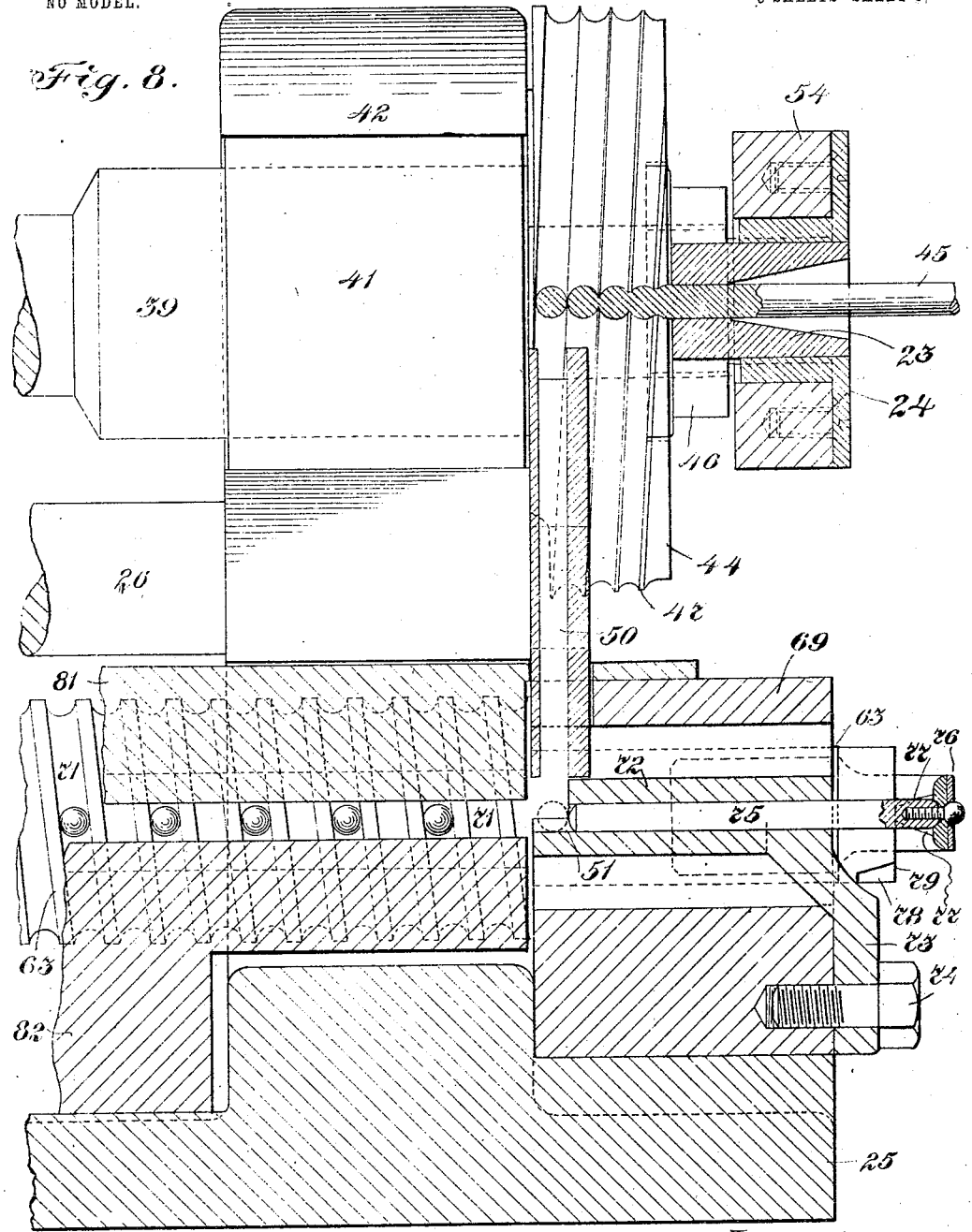

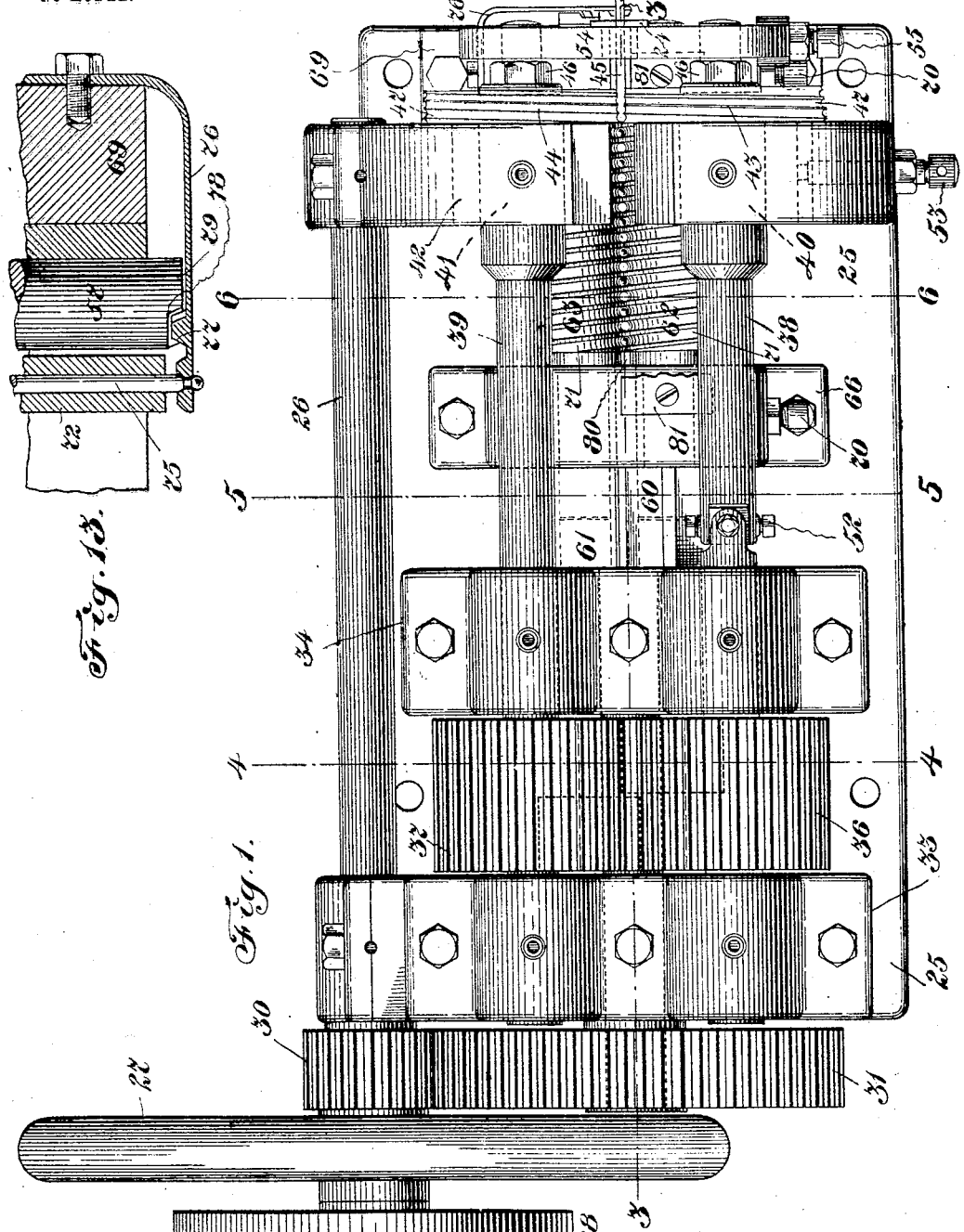

No. 729,519. PATENTED MAY 26, 1903.
H. A. WILLIAMS.
MACHINE FOR MAKING METAL BALLS.
APPLICATION FILED AUG. 30, 1902.
NO MODEL. 6 SHEETS—SHEET 2.
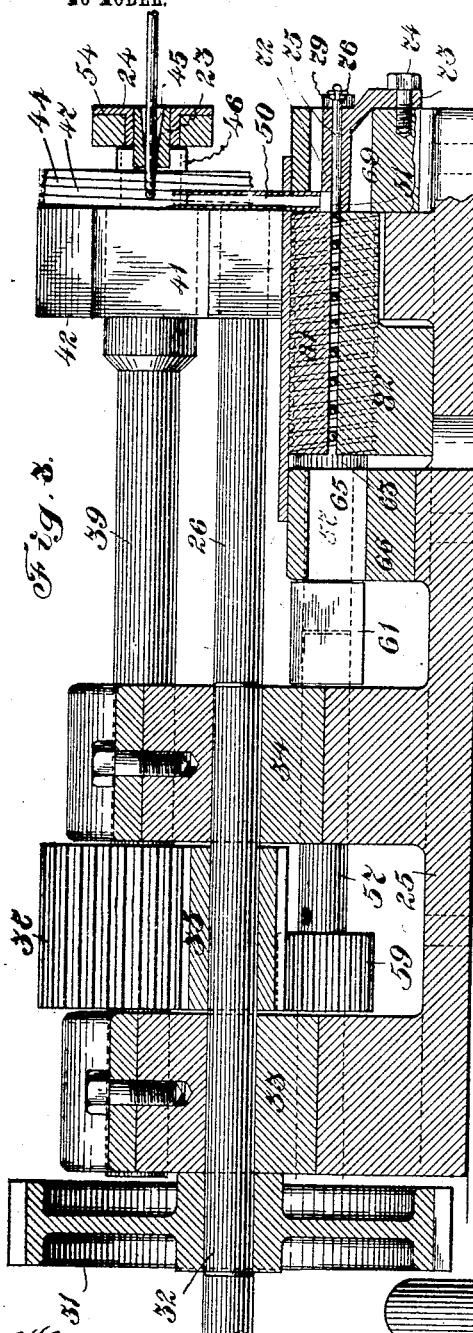
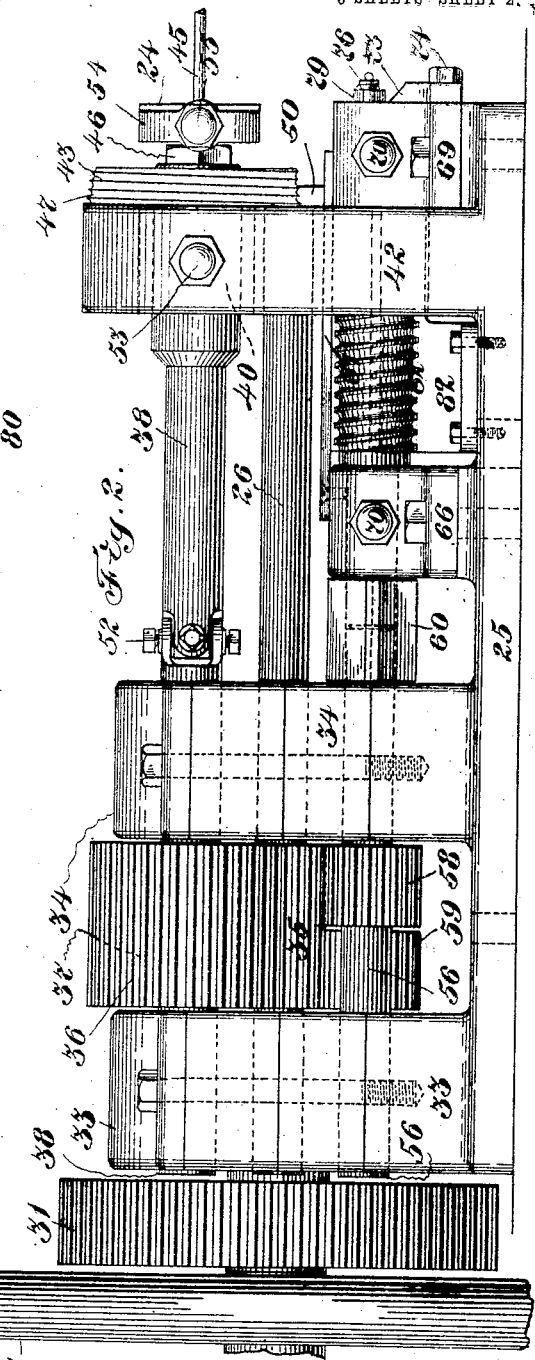
Witnesses:
R. Henry Marsh.
F. B. Spaulding
Inventor,
Henry A. Williams,
by Teschemacher
Attorney.

No. 729,519. PATENTED MAY 26, 1903.
H. A. WILLIAMS.
MACHINE FOR MAKING METAL BALLS.
APPLICATION FILED AUG. 30, 1902.
NO MODEL. 6 SHEETS—SHEET 3.
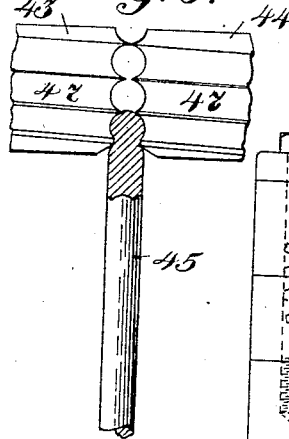
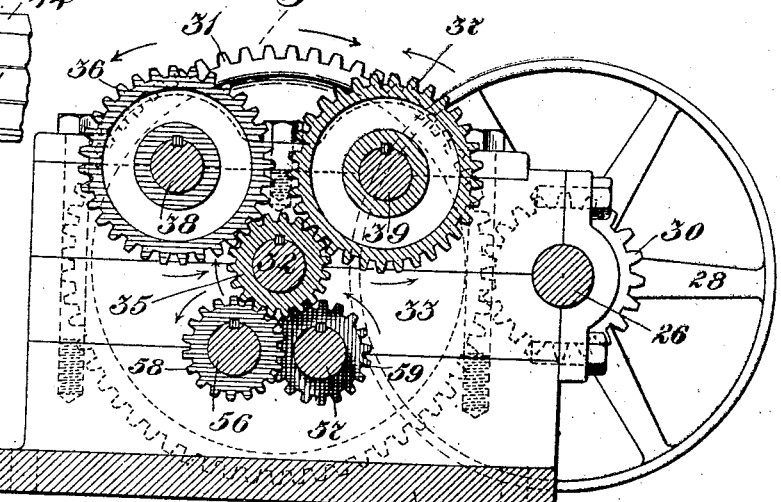
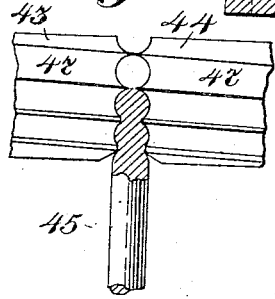
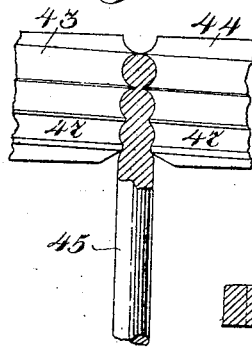
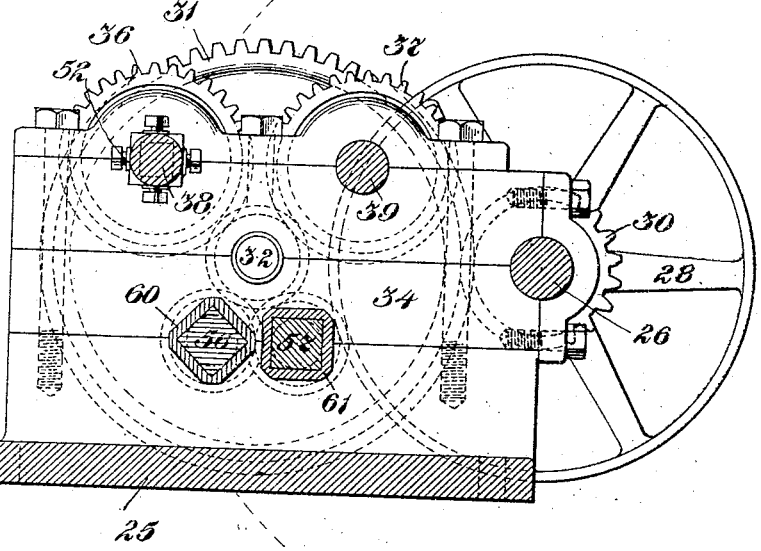

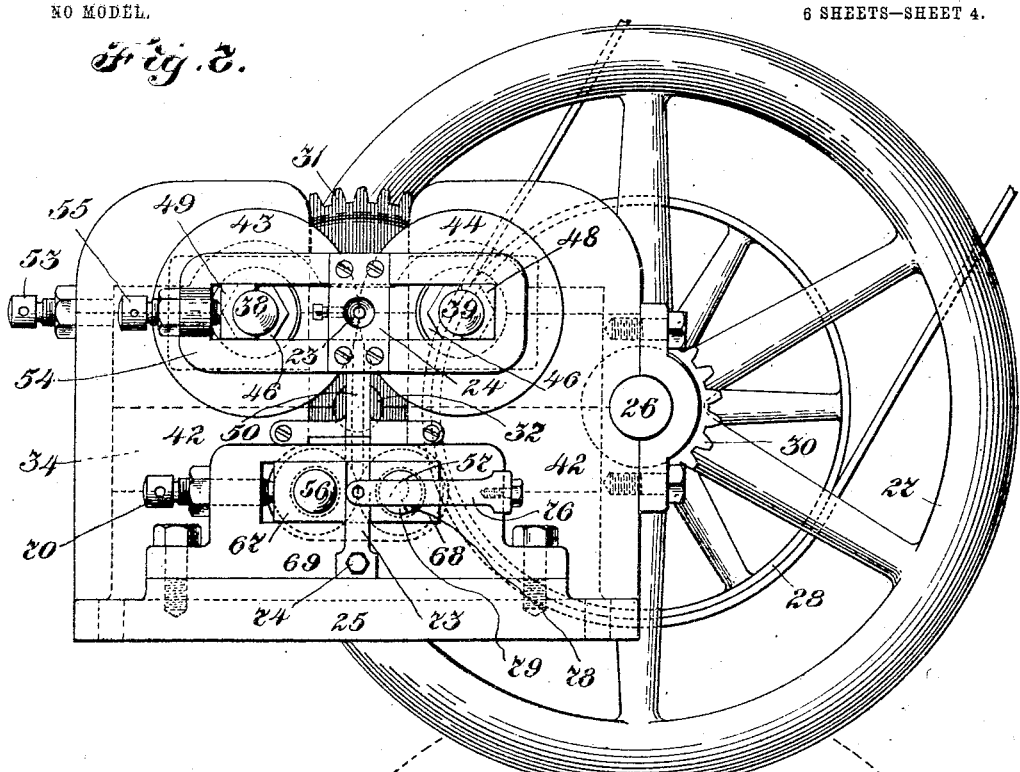

No. 729,519. PATENTED MAY 26, 1903.
H. A. WILLIAMS.
MACHINE FOR MAKING METAL BALLS.
APPLICATION FILED AUG. 30, 1902.
NO MODEL. 6 SHEETS—SHEET 5.

Witnesses:
R. Henry Marsh.
F. B. Spaulding

Inventor,
Henry H. Williams,
by Teschemacher
Attorney.

No. 729,519. PATENTED MAY 26, 1903.
H. A. WILLIAMS.
MACHINE FOR MAKING METAL BALLS.
APPLICATION FILED AUG. 30, 1902.
NO MODEL. 6 SHEETS—SHEET 6.
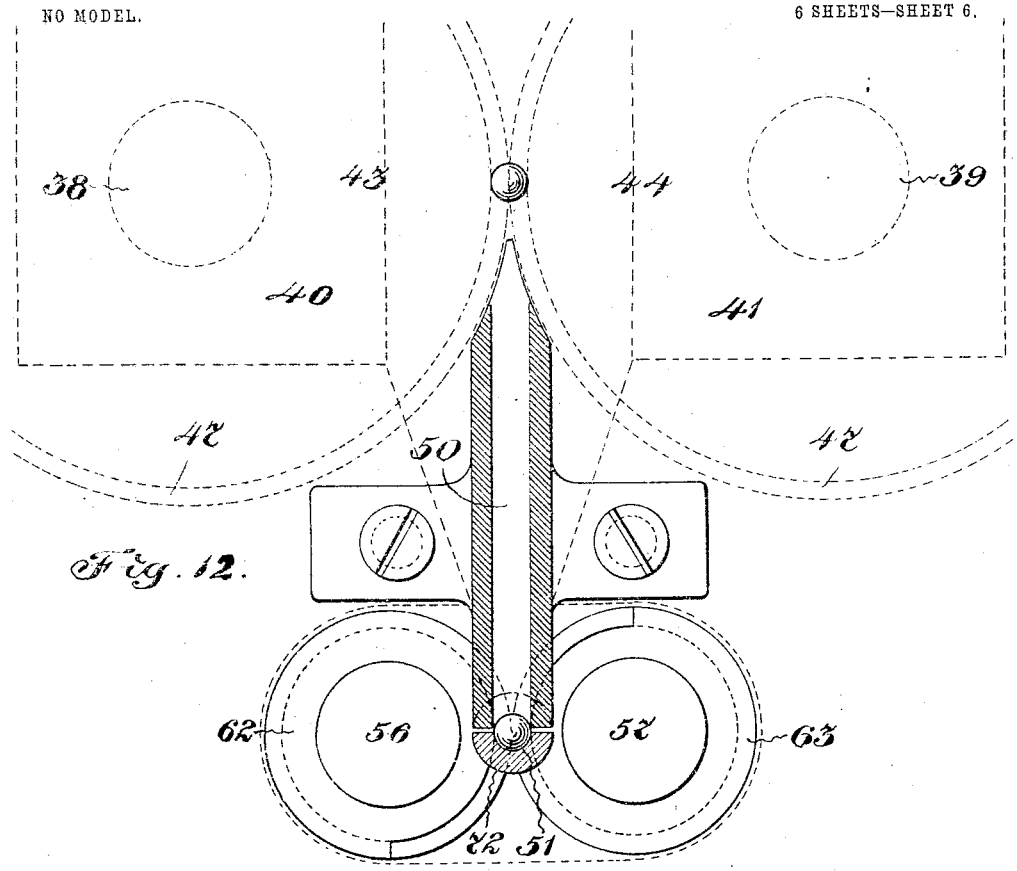
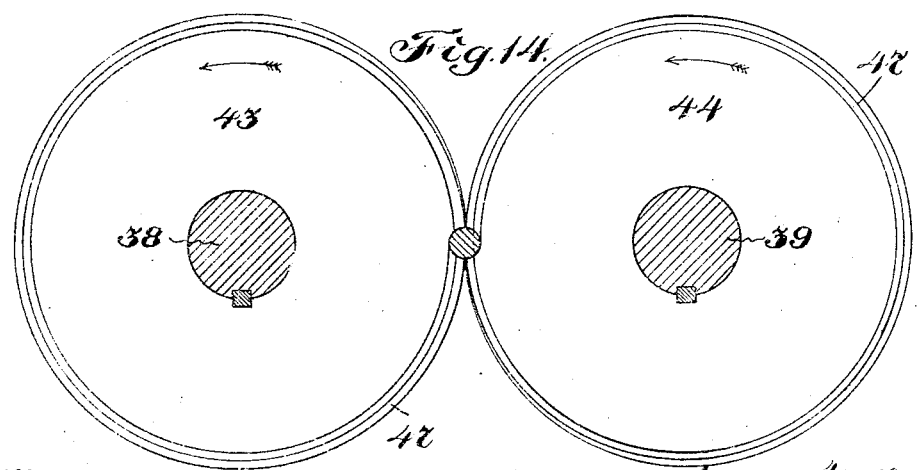
Witnesses:
Inventor,
Henry A. Williams.
by Teschemacher
Attorney.

No. 729,519. Patented May 26, 1903.

UNITED STATES PATENT OFFICE.

HENRY ALEXIS WILLIAMS, OF QUINCY, MASSACHUSETTS, ASSIGNOR TO ELMER C. BASSETT, OF EAST MILTON, MASSACHUSETTS.

MACHINE FOR MAKING METAL BALLS.

SPECIFICATION forming part of Letters Patent No. 729,519, dated May 26, 1903.

Application filed August 30, 1902. Serial No. 121,666. (No model.)

*To all whom it may concern:*

Be it known that I, HENRY ALEXIS WILLIAMS, a citizen of the United States, residing at Quincy, in the county of Norfolk and State of Massachusetts, have invented certain Improvements in Machines for Making Metal Balls, of which the following is a specification.

My invention relates to machines for making cold-rolled metal balls, and has for its object the production of a machine of this character by means of which perfectly spherical and highly-finished metal balls can be produced with much greater rapidity than heretofore.

To this end my invention consists in a machine of the character described having dies for forming the balls from a cold metal rod, combined with spirally-grooved finishing-rolls adapted to receive the balls from the forming-dies, and means whereby each ball as it comes from the forming-dies is properly placed at the required time between the spirally-grooved finishing-rolls and supported in place while being rolled and finished, as hereinafter particularly described; and my invention also consists in certain other combinations of parts and details of construction hereinafter fully described, and pointed out in the claims.

In the accompanying drawings, Figure 1 is a plan of a machine for making metal balls constructed in accordance with my invention. Fig. 2 is a side elevation of the same. Fig. 3 is a longitudinal vertical section on the line 3 3 of Fig. 1. Fig. 4 is a transverse vertical section on the line 4 4 of Fig. 1. Fig. 5 is a transverse vertical section on the line 5 5 of Fig. 1. Fig. 6 is a transverse vertical section on the line 6 6 of Fig. 1. Fig. 7 is a front elevation of the machine. Fig. 8 is an enlarged longitudinal section of the front end of the machine, similar to that shown in Fig. 3. Figs. 9, 10, and 11 are diagrams illustrating the progressive operation of the dies in forming the balls from a cold metal rod. Figs. 12 and 13 are details to be referred to. Fig. 14 is an enlarged front view of the ball-forming dies, showing the position between the same of the rod from which the balls are formed.

In the said drawings, 25 represents the bed of the machine. 26 is the driving-shaft, mounted in suitable bearings secured to standards rising from the bed 25, said shaft 26 carrying the balance-wheel 27 and fast and loose pulleys 28 29. To the shaft 26 is also secured a pinion 30, which meshes with a large gear 31, mounted on a short shaft 32, supported in bearings in standards 33 34, rising from the bed 25. To the shaft 32 is secured a long pinion 35, which meshes with two gears 36 37, arranged above and on opposite sides of the said pinion, whereby they are caused to rotate in the same direction, said gears being fast on two horizontal shafts 38 39, supported in bearings in the standards 33 34 and also at their front ends in boxes 40 41, supported in a standard 42, rising from the front end of the bed 25.

To the shafts 38 39, outside the standard 42, are rigidly secured two dies 43 44 for forming the balls from a cold round metal rod 45, which is supported by a guide-plate 24, secured to an adjacent portion of the machine, said guide-plate being provided with a removable bushing 23, Figs. 3, 7, and 8, through the conical interior of which the rod 45 is passed to the dies, which are arranged to receive said rod between them. Each of these dies consists of a disk keyed to its shaft and held in place thereon by a washer and a nut 46 and having formed around its periphery a spiral groove 47, the outer edge of which is of constantly-increasing diameter from front to rear, at which latter point the outer edges of the said spiral grooves of the two disks come into contact to sever the ball from the rod 45. The outer edge of this groove 47 also constantly decreases in width as it winds around the disk from front to rear, at which latter point it terminates in a sharp edge. In Fig. 14 the rod 45 is shown as just entered between the dies, and as they revolve the rod is drawn inward by the spiral grooves, assuming after a complete revolution of the dies the position shown in Fig. 9, with a ball partially shaped thereon. On the second revolution of the dies the rod is drawn still farther inward, as shown in Fig. 10, when the first ball will be two-thirds completed, another ball being partially formed behind it. On the third revolution of the dies, the rod having been still farther drawn inward, as shown in Fig. 11, the first ball will be nearly completed, the second ball two-thirds completed, while the third ball will be in the same partial state of completion as the first ball shown in Fig. 9. During the next revolution of the dies the first ball is severed from the rod, being completely formed, as shown in Fig. 8, and then drops through a vertical chute or conductor 50 onto a rest 51, as shown in Figs. 8 and 12, from which it is afterward transferred to the finishing-rolls, to be hereinafter described.

By progressively forming a series of balls from a rod one behind the other in the manner above described, it will be obvious that there will be no waste of stock whatever, the end of the rod from which the ball is severed being left of hemispherical shape and forming the front half of the next ball to be severed.

It will be seen from the foregoing that the outer edges of the two spiral grooves 47 of the disks 43 44 progressively act in unison on the rod to compress and shape the metal, while the bottoms of the said two spiral grooves are at the same horizontal distance apart from front to rear throughout their convolutions, this distance corresponding to the diameter of the finished ball and rod from which it is formed.

As the dies become worn from grinding it becomes necessary to move one of the ball-forming dies toward the other in order to maintain them in perfect operative contact, and I therefore provide the die-shaft 38 with a universal joint 52, as shown in Figs. 1 and 2, and employ an adjusting-screw 53, passing through the standard 42 and bearing upon the box 40 of said shaft 38.

The shafts 38 39 are extended forward beyond the nuts 46, where they are of reduced diameter, said forward ends resting in half-boxes 48 49, supported in a transverse yoke 54, which is provided at one end with an adjusting-screw 55, bearing against the adjacent box 49, whereby said box may be forced toward the box 48 and the outer ends of the die-shafts thus prevented from springing apart, as is necessary to enable the dies to be constantly maintained in operative contact.

Beneath the long pinion 35 and on each side thereof are two short horizontal shafts 56 57, having their bearings in the standards 33 34 and carrying short pinions 58 59, which engage the pinion 35, by which they are both rotated in the same direction. The forward ends of the shafts 56 57 are squared, as shown in Fig. 5, and are connected by couplings 60 61 with the squared ends of the journals of two parallel finishing-rolls 62 63, having their bearings in boxes 64 65 supported in a bracket 66, the journals at the opposite or front ends of these rolls resting in similar boxes 67 68, supported in another bracket 69, each bracket being provided with an adjusting-screw 70, bearing against the box adjacent thereto, said adjusting-screws serving to keep the peripheries of the finishing-rolls in contact with each other, the front ends of said finishing-rolls extending through an opening in the front of the standard 42. Each of the finishing-rolls 62 63 is provided with a spiral semicircular groove 71, extending continuously around it from end to end, the grooves of the said two rolls registering with each other and forming in a horizontal plane passing through the axes of these rolls, where their peripheries are in contact, circular openings corresponding exactly in diameter to that of the finished balls.

The rest 51, upon which the ball falls from the forming-dies, consists of a U-shaped projection at the inner end of a tubular casting 72, provided at its outer end with an arm 73, which is secured by a screw 74 to the bracket 69. The casting 72, thus supported in a horizontal position, forms a guide for a plunger-rod or pusher 75, to the outer end of which is secured a flat spring 76, also fastened at its opposite end to the bracket 69 and acting to force the plunger 75 inward against a ball upon the rest 51 when permitted to do so by a projection 77 on the inner side of said spring dropping into a notch 78 in the face of a cam 79, formed on or secured to the end of the front journal of the finishing-roll 63, as shown in Figs. 8 and 13, the plunger when thus thrust inward forcing the ball on the rest 51 into the opening formed by the commencement of the two spiral grooves 71 of the finishing-rolls, the ball being then carried along within and by said spiral grooves in a horizontal plane, passing through the axes of the rolls, until it reaches the opposite ends of said rolls, when it drops out through an opening formed by the termination of the grooves similar to that at the opposite ends of the rolls where it entered, the ball then falling through a hole 80 in the bed 25 (shown in Figs. 1 and 3) into a suitable receptacle placed to receive it. The ball while traveling through the grooves of the finishing-rolls is maintained in a horizontal plane by means of two guard-plates 81 82, one above and the other beneath the point of contact of the peripheries of the rolls, as shown in Figs. 3, 6, and 8, said plates being beveled at their edges to enable them to more closely fit between the rolls and the upper guard-plate 81 being secured to the brackets 66 69 and the lower plate 82 to the bed 25, as shown in Figs. 2 and 6. The circular openings formed by the grooves 71 are of slightly less diameter than that of the ball as it comes from the forming-dies, whereby a certain amount of compression of the ball is produced as it is carried from end to end of the finishing-rolls. The finishing-rolls make two complete revolutions to each single revolution of the forming-dies, and consequently there will be one ball only in every alternate convolution of the spiral grooves 71, as shown in Figs. 3 and 8.

By the universal rotary motion of the balls as they travel from end to end of the finishing-rolls, as described, the metal is rendered more dense and homogeneous, thus reducing the liability of fracture to a minimum, while the surface of the ball becomes polished, producing a finish, so that the ball after being hardened requires very little further polishing, advantages hitherto unattained in the manufacture of metal balls.

The above-described machine may be adapted for making balls of various sizes, it being merely necessary to remove the ball-forming dies and finishing-rolls and substitute others having grooves of the required size, the bushing 23 of the supporting-guide, through which the rod passes to the dies, being also replaced by another of suitable size adapted to receive and support the rod in its proper central position with respect to said dies.

What I claim as my invention, and desire to secure by Letters Patent, is—

1. A metal-ball-making machine comprising dies for forming the balls from a rod, spirally-grooved rolls for rolling and finishing said balls, a rest for receiving said balls from said dies, a reciprocating plunger for transferring the balls from said rest to said finishing-rolls, and means for operating said plunger.

2. A metal-ball-making machine comprising a pair of dies for forming the balls from a rod, spirally-grooved rolls for rolling and finishing said balls, a rest for receiving said balls one by one from said dies, a reciprocating plunger for transferring the balls from said rest to said finishing-rolls, a spring and cam for actuating said plunger, and means for holding the balls in place while being operated upon by the finishing-rolls.

3. A metal-ball-making machine comprising dies for forming the balls from a rod, spirally-grooved rolls for rolling and finishing said balls, a rest for receiving the balls from the dies, a reciprocating plunger for transferring the balls from said rest to said finishing-rolls, means for actuating said plunger, and vertical guide-plates arranged between said finishing-rolls above and beneath the same for holding the balls within the grooves of said rolls while traveling through the same.

4. In a metal-ball-making machine, a pair of dies rotating in the same direction for forming the balls from a rod, spirally-grooved rolls for rolling and finishing said balls, a rest for receiving the balls from the dies, a chute for conducting the balls from the forming-dies to the rest, a reciprocating plunger for transferring the balls from said rest to said finishing-rolls, means for actuating said plunger, and means for holding said balls in place within the grooves of the finishing-rolls while traveling through the same.

5. In a machine for making metal balls, the combination of a pair of dies for forming the balls from a rod, each of said dies consisting of a disk provided with a ball-forming groove extending spirally around its periphery and having its outer edge of gradually-increasing height from front to rear, a pair of finishing-rolls each provided with a semicircular groove extending spirally around its periphery, whereby circular openings are formed at the points of contact of the edges of the opposite grooves of said rolls, a rest for receiving each ball as it drops from the forming-dies and holding it in position to enter the grooves of the finishing-rolls, means for transferring the balls from said rest to said finishing-rolls, and means for holding said balls within the grooves of said rolls while traveling through the same.

6. In a machine for making metal balls, the combination with the ball-forming dies and their shafts, the front end of the latter being extended beyond the dies, of a yoke fitting over the outer ends of said shafts and provided at its ends with journal-boxes for the same, and an adjusting-screw at one end of said yoke bearing against the journal-box adjacent thereto, whereby the dies are prevented from springing apart and maintained in perfect operative contact with each other.

Witness my hand this 20th day of August, A. D. 1902.

HENRY ALEXIS WILLIAMS.

In presence of—
P. E. TESCHEMACHER,
J. J. SULLIVAN.